(12) United States Patent
     Masuda

(10) Patent No.: US 9,291,332 B2
(45) Date of Patent: Mar. 22, 2016

(54) LIGHT SOURCE UNIT CAPABLE OF PREVENTING DETERIORATION OF LUMINESCENT MATERIAL LAYER, ILLUMINATING METHOD OF LIGHT SOURCE UNIT, AND PROJECTOR

(71) Applicant: CASIO COMPUTER CO., LTD., Shibuya-ku, Tokyo (JP)

(72) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 81 days.

(21) Appl. No.: 14/030,982

(22) Filed: Sep. 18, 2013

(65) Prior Publication Data
     US 2014/0078168 A1    Mar. 20, 2014

(30) Foreign Application Priority Data
     Sep. 20, 2012   (JP) ................................. 2012-207405

(51) Int. Cl.
     G03B 21/20    (2006.01)
     H04N 9/31     (2006.01)
     F21V 9/00     (2015.01)
     G03B 33/08    (2006.01)

(52) U.S. Cl.
     CPC .............. F21V 9/00 (2013.01); G03B 21/204 (2013.01); G03B 21/2006 (2013.01); G03B 33/08 (2013.01); H04N 9/3164 (2013.01)

(58) Field of Classification Search
     CPC ............. G03B 21/204; G03B 21/2013; G03B 21/2066; H04N 9/3161; H04N 9/3164; H04N 9/3158; H04N 9/3111; H04N 9/3114
     USPC .......................................................... 353/94
     See application file for complete search history.

(56) References Cited

U.S. PATENT DOCUMENTS 8,403,492 B2 *   3/2013  Shibasaki ........................ 353/31
8,840,253 B2     9/2014  Kitano
8,894,241 B2 *  11/2014  Kitano ........................... 362/257

(Continued)

FOREIGN PATENT DOCUMENTS

JP        2011-053323 A    3/2011

OTHER PUBLICATIONS

Related U.S. Appl. No. 14/031,643; First Named Inventor: Hiroki Masuda; Title: "Light Source Unit Capable of Shining Light of High In-Plane Uniformity, Illuminating Method of Light Source Unit, and Projector"; Filed: Sep. 19, 2013.

Primary Examiner — William C Dowling
Assistant Examiner — Ryan Howard
(74) Attorney, Agent, or Firm — Holtz, Holtz & Volek PC

(57) ABSTRACT

There is provided a light source unit including an excitation light source emitting excitation light, and a luminescent member having a transmission portion transmitting excitation light from the excitation light source, a first luminescent material layer placed beside the transmission portion on one side of the luminescent member and a second luminescent material layer placed beside the transmission portion on the other side of the luminescent member, wherein the first luminescent material layer and/or the second luminescent material layer emits luminous light by being excited by the excitation light, and wherein a guiding optical system is provided which shines excitation light which has passed through the transmission portion from the excitation light source on to the first luminescent material layer and causes luminous light emitted from the first luminescent material layer to be incident on the transmission portion.

11 Claims, 6 Drawing Sheets

(56) References Cited

U.S. PATENT DOCUMENTS

| | | |
|---|---|---|
| 2009/0034284 A1* | 2/2009 | Li et al. .................. 362/554 |
| 2011/0234923 A1 | 9/2011 | Yamagishi et al. |
| 2011/0310362 A1 | 12/2011 | Komatsu et al. |
| 2012/0133903 A1 | 5/2012 | Tanaka et al. |
| 2013/0107223 A1 | 5/2013 | Toyooka |
| 2015/0172610 A1 | 6/2015 | Candry et al. |

* cited by examiner

LIGHT SOURCE UNIT CAPABLE OF PREVENTING DETERIORATION OF LUMINESCENT MATERIAL LAYER, ILLUMINATING METHOD OF LIGHT SOURCE UNIT, AND PROJECTOR

CROSS-REFERENCE TO RELATED APPLICATION

This application is based upon and claims the benefit of priority under 35 USC 119 of Japanese Patent Application No. 2012-207405 filed on Sep. 20, 2012, the entire contents of which are incorporated herein by reference.

BACKGROUND OF THE INVENTION

1. Field of the Invention

The present invention relates to a light source unit capable of preventing the deterioration of a luminescent material layer, an illumination method of this light source unit and a projector including the light source unit.

2. Description of the Related Art

In these days, data projectors are used on many occasions as an image projection unit which projects images including an image of a screen and a video image of a personal computer, as well as images based on image data which is stored in a memory card on to a screen. In these data projectors, light emitted from a light source is caused to converge to a micromirror display element called a DMD (Digital Micromirror Device) or a liquid crystal panel so that a color image is displayed on a screen.

Conventionally, the mainstream of these projectors has been those which utilize a high-intensity discharge lamp as a light source. In recent years, however, there have been made various developments on projectors which use, as a light source, a light emitting diode, a laser diode, an organic EL device or a luminescent material.

Additionally, in recent years, there have also been made various proposals on a light source unit having a light emitting diode as an excitation light source and a luminescent wheel in which a luminescent material layer which converts light such as ultraviolet light emitted from the excitation light source as excitation light into visible light is formed on a transparent base.

In the present state in which the production of a light emitting diode is difficult which can emit highly bright light of a range of green wavelengths as a light source for the projectors described above, Japanese Unexamined Patent Publication No. 2011-53323 discloses a projector which utilizes a light source unit which emits highly bright light of a range of green wavelengths by using a green light emitting luminescent material and a small and high-output laser diode as an excitation light source. As a result, the projector can project a clear image on a screen even in a bright room.

In addition, the applicant of this patent application has proposed various light source units in which a luminescent material is used as a light emitting material which emits light by using a laser beam as excitation light. In some of the light source units, a diffuse transmission area where excitation light is transmitted and a light emitting area where luminous light is emitted by a luminescent material are formed on a rotational member, whereby a pencil of highly bright light having high in-plane uniformity can be emitted.

In the light source unit in which the diffuse transmission area and the luminous light emitting area are provided on the rotational member, the utilization efficiency of the rotational member is not sufficient. Additionally, there are demands for a light source unit suitable for use in a projector which has a longer life or a wider range of applications.

SUMMARY OF THE INVENTION

Meeting the demands, the invention provides a light source unit having a higher utilization efficiency of a rotational member and a projector utilizing a light source unit having a wider range of applications.

According to a preferred aspect of the invention, there is provided a light source unit including:

an excitation light source which emits excitation light; and a luminescent member having a transmission portion which transmits excitation light from the excitation light source, a first luminescent material layer placed beside the transmission portion on one side of the luminescent member and a second luminescent material layer placed beside the transmission portion on the other side of the luminescent member, wherein the first luminescent material layer and/or the second luminescent material layer emits luminous light by being excited by the excitation light; and a guiding optical system which guides the excitation light and the luminous light so as to shine the excitation light which has passed through the transmission portion on to the first luminescent material layer and causes luminous light emitted from the first luminescent material layer to be incident on the transmission portion.

BRIEF DESCRIPTION OF THE SEVERAL VIEWS OF THE DRAWINGS

The above and further objects, characteristics and advantages of the invention will be more obvious from the following detailed description along with accompanying drawings. Here.

DETAILED DESCRIPTION OF THE PREFERRED EMBODIMENT

Figure 1:
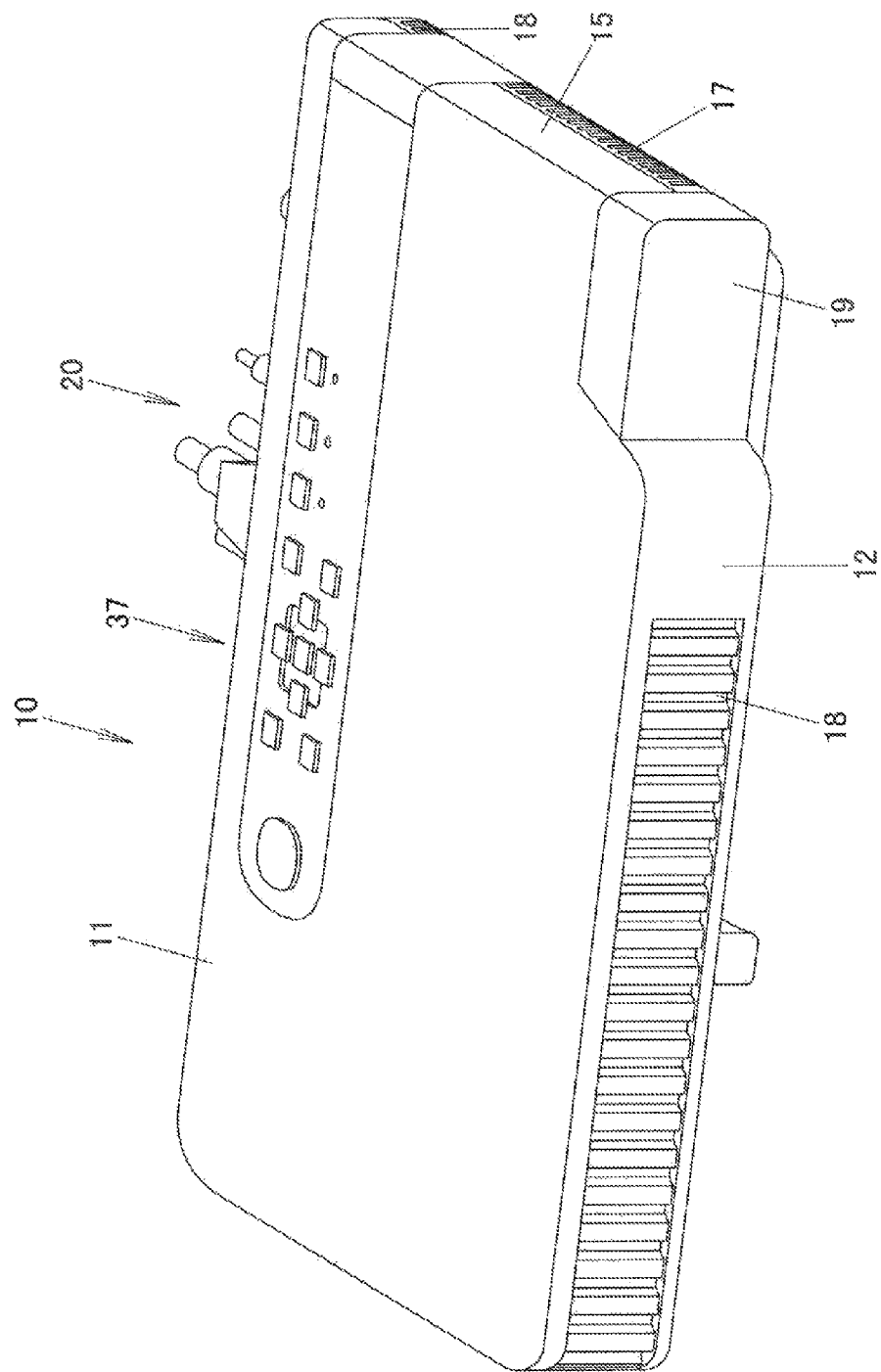
FIG. 1 is an external perspective view showing one example of a projector according to an embodiment of the invention.

Hereinafter, a best mode for carrying out the invention will be described in detail by the use of the accompanying drawings. Although various limitations which are technically preferable to carry out the invention are given to embodiments which will be described below, the scope of the invention should not be limited at all to the embodiments and drawings described below.

According to one embodiment of the invention, a projector 10 includes a light source unit 60 as a light source device, a display element 51, a light-source-side optical system 170 which guides light from the light source unit 60 to the display element 51, a projection-side optical system 220 which projects an image emitted from the display element 51 on to a screen, and a projector control unit which controls the light source unit 60 and the display element 51.

The light source unit 60 includes a green light source device made up of an excitation light shining device 70 and a luminous light emitting device 100, a red light source device 120, a blue light source device 130, and a light guiding optical system 140.

The excitation light shining device 70 of the green light source device includes excitation light sources 71 which shine excitation light of a range of blue wavelengths on to a luminescent wheel 101 as a rotational member. In addition, the luminescent wheel 101 of the luminous light emitting device 100 in the green light source device is formed into a luminescent rotational member of a circular disk-shaped metallic base. The luminescent wheel 101 has a first luminous light emitting area of a semi-annular shape on which a first luminescent material 102 made of a green luminescent material is formed and a diffuse transmission portion 104 which transmits light in a diffusing fashion on one side of the circular disk-shaped metallic base. The luminescent wheel 101 also has second luminous light emitting area of a semi-annular shape on which a second luminescent material layer 103 is formed on the other side of the metallic base and the second luminescent material layer 103 is placed beside the diffuse transmission portion 104 in an end to end fashion.

Further, this luminous light emitting device 100 has a light guiding optical system made up of mirrors 108, 109 and collective lenses 105, 106, 107 which shine excitation light which passes through the diffuse transmission portion 104 of the luminescent wheel 101 towards the luminescent material layer 102 of the luminescent wheel 101 and which enable luminous light from the first luminescent material layer 102 to pass through the diffuse transmission portion 104. The excitation light shining device 70 is illuminated while rotating the luminescent wheel 101.

Consequently, when light of the range of blue wavelengths from the excitation light shining device 70 passes through the diffuse transmission portion 104 of the luminescent wheel 101 to be shone on to the first luminous light emitting area, light of the range of green wavelengths is emitted from the luminescent material layer 102 of the green luminescent material which absorbs the blue light as excitation light. This luminous light of the range of green wavelengths is caused to be incident on the diffuse transmission portion 104 of the luminescent wheel 101 through the light guiding optical system, passes through the diffuse transmission portion 104 and is finally emitted from the luminous light emitting device 100. Namely, luminous light from the first luminescent material layer 102 is allowed to pass through the diffuse transmission portion 104 by the rotation of the luminescent wheel 101, and therefore, it is possible to emit light having high in-plane uniformity from the luminous light emitting device 100.

Additionally, by delaying the illumination timing of the excitation light shining device 70, light of the range of blue wavelengths which is excitation light from the excitation light shining device 70 is allowed to be shone on to the second luminescent material layer 103 on the other side of the luminescent wheel 101 which is a side facing the excitation light shining device 70, thereby making it possible to allow luminous light from the second luminescent material layer 103 to be emitted from the luminous light emitting device 100.

Further, the red light source device 120 has a red light emitting diode which is a semiconductor light emitting element which emits light of a range of red wavelengths as a red light source 121. The blue light source device 130 has a blue light emitting diode which is a semiconductor light emitting element which emits light of a range of blue wavelengths as a blue light source 131. The light guiding optical system 140 is configured so as to change the axis of green, red and blue light emitted from the luminescent wheel 101, the red light source device 120 and the blue light source device 130 so that pencils of light of the respective colors are collected to an entrance of a light tunnel 175 and hence has pluralities of dichroic mirrors, collective lenses and the like.

Then, in the light source unit 60, a light source controller of the projector control unit controls individually the emission of light from the excitation light source device 70, the red light source device 120 and the blue light source device 130, whereby combined light or light of a single color can be emitted from the light source unit 60.

Hereinafter, the embodiment of the invention will be described in detail based on the drawings. FIG. 1 is an external perspective view of the projector 10. In this embodiment, when left and right are referred to with respect to the projector 10, they denote, respectively, left and right with respect to a projecting direction, and when front and rear are referred to with respect to the projector 10, they denote, respectively, front and rear with respect to a direction towards a screen and the traveling direction of a pencil of light emitted from the projector 10 towards the screen.

As is shown in FIG. 1, the projector 10 has a substantially rectangular parallelepiped shape. The projector 10 has a lens cover 19 for covering a projection port which is laid to a side of a front panel 12 which is referred to as a front side panel of a projector casing. Additionally, a plurality of outside air inlet slits 18 are provided in the front panel 12. Further, although not shown, the projector 10 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where USB terminals, an image signal input D-SUB terminal, an S terminal, an RCA terminal and the like are provided and various types of terminals including a power supply adaptor plug. Additionally, a plurality of outside air inlet slits 18 are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15. Further, pluralities of outside air inlet slits or inside air outlet slits are formed in a lower panel, not shown, in portions lying near the front, back, left and right panels.

Figure 2:
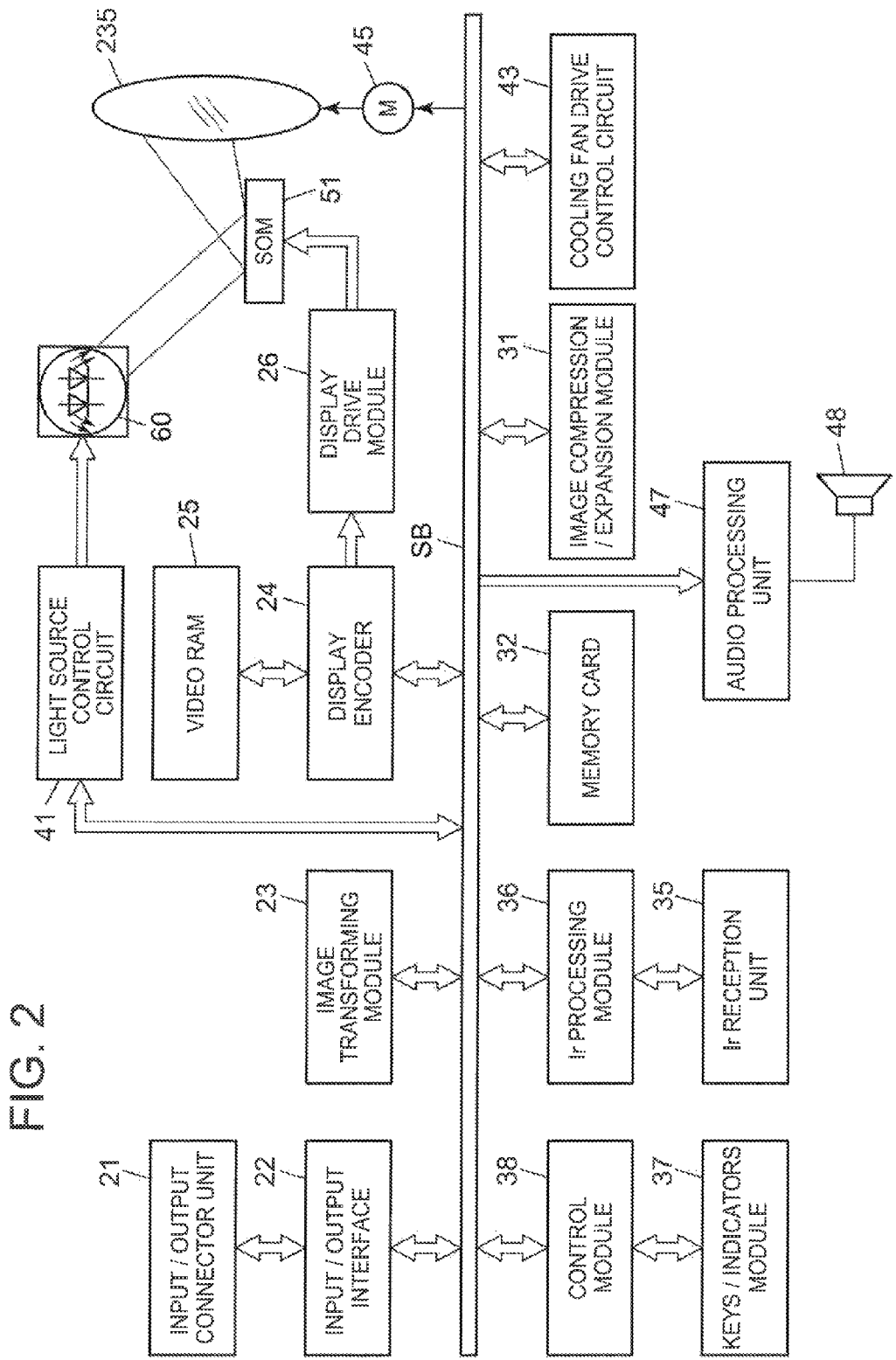
FIG. 2 is a block diagram showing a functional circuit block of the projector according to the embodiment of the invention.

Next, the projector control unit of the projector 10 will be described by the use of a functional block diagram shown in FIG. 2. The projector control unit includes a control module 38, an input/output interface 22, an image transforming module 23, a display encoder 24, a display drive module 26 and the like, whereby image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive module 26.

The display drive module 26 functions as a display element control module and drives the display element 51, which is a spatial optical modulator (SOM), at an appropriate frame rate in response to the image signal outputted from the display encoder 24.

In this projector 10, a pencil of light which is emitted from the light source unit 60 as a light source device is shone onto the display element 51 via the light-source-side optical system 170 to thereby form an optical image based on reflected light which is reflected by the display element 51. The image so formed is then projected on to a screen, not shown, for display thereon via the projection-side optical system 220, which will be described later. In addition, a movable lens group 235 of the projection-side optical system 220 is driven by a lens motor 45 for zooming or focusing.

An image compression/expansion module 31 performs a recording operation in which a luminance signal and a color difference signal of an image signal are data compressed through ADCT and Huffman coding operations and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images based on the image data stored on the memory card 32.

The control module 38 governs the control of respective operations of circuitries within the projector 10 and is made up of a CPU, a ROM which stores in a fixed fashion operation programs of various types of settings and a RAM which is used as a work memory.

Operation signals generated at the keys/indicators module 37 which is made up of the main keys and indicators provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls individually the emission of light from the excitation light shining device 70, the red light source device 120 and the blue light source device 130 of the light source unit 60 so that light of predetermined ranges of wavelengths which is required when an image is generated is emitted from the light source unit 60.

Further, the control module 38 causes a cooling fan drive control circuit 43 to detect temperatures through a plurality of temperature sensors which are provided in the light source unit 60 and the like so as to control the rotating speed of cooling fans based on the results of the temperature detection. Additionally, the control module 38 also causes the cooling fan drive control circuit 43 to keep the cooling fan rotating even after the power supply to a projector main body is switched off by use of a timer or the like. Alternatively, the control module 38 causes the cooling fan drive control circuit 43 to cut off the power supply to the projector main body depending upon the results of the temperature detections by the temperature sensors.

Figure 3:
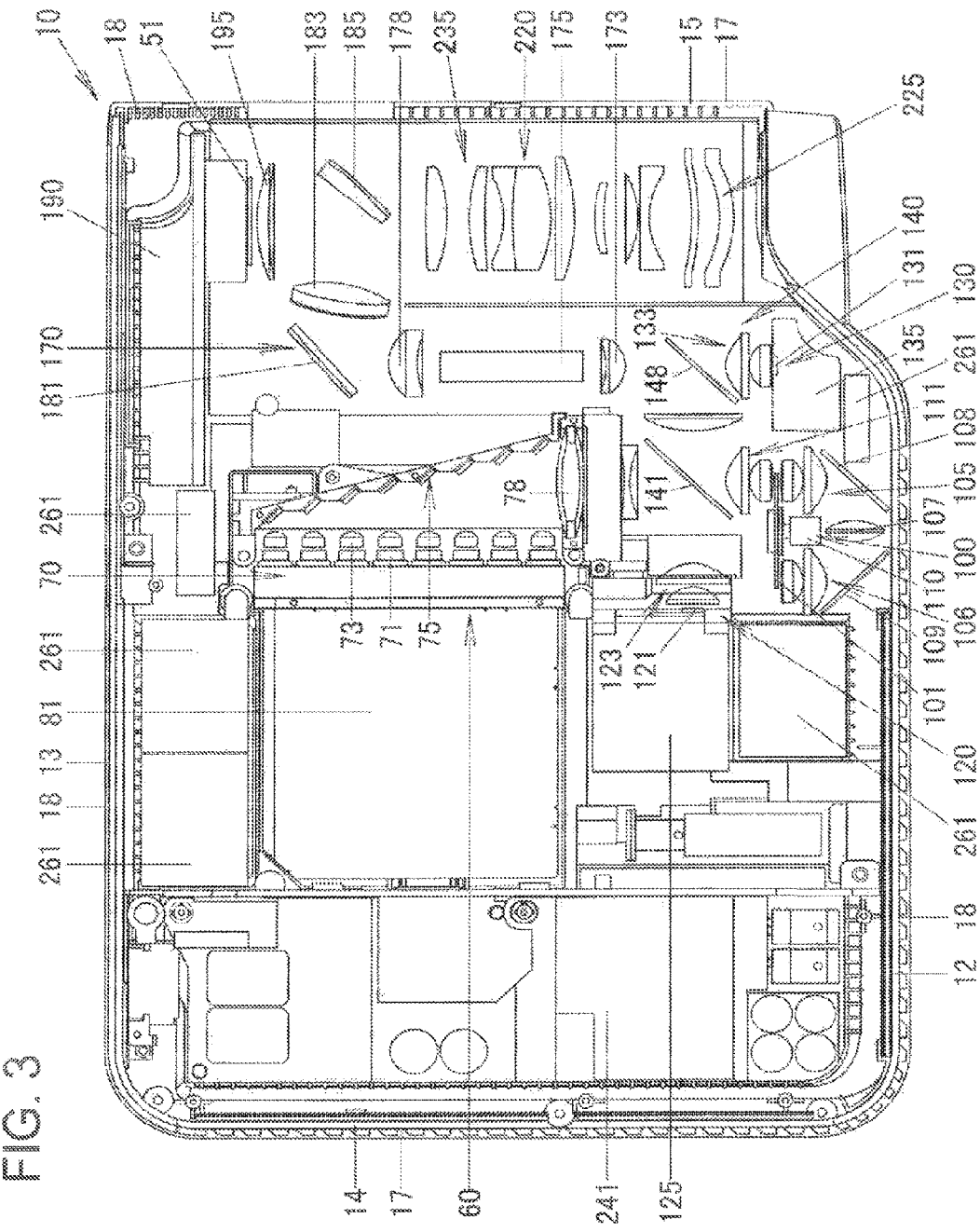
FIG. 3 is an exemplary plan view showing one example of an internal construction of the projector according to the embodiment of the invention.

Next, an internal construction of the projector 10 will be described. FIG. 3 is an exemplary plan view showing an internal construction of the projector 10. As shown in FIG. 3, the projector 10 includes a control circuit board 241 in proximity to the right panel 14. This control circuit board 241 includes a power supply circuit block, a light source control block and the like. Additionally, the projector 10 includes, as a light source unit of the invention, the light source unit 60 configured as shown in FIG. 4 which is located to a side of the control circuit board 241, that is, in a central portion of the projector casing.

Further, the projector 10 includes the light-source-side optical system 170 and the projection-side optical system 220 between the light source unit 60 and the left panel 15. In addition, the projection-side optical system 220 is disposed along the left panel 15, and the display element 51 which is a DMD (Digital Micromirror Device) is provided at the rear of the projection-side optical system 220 and near the back panel 13, whereby light emitted from the light source 60 is guided to the display element 51 by the light-source-side optical system 170.

Figure 4:
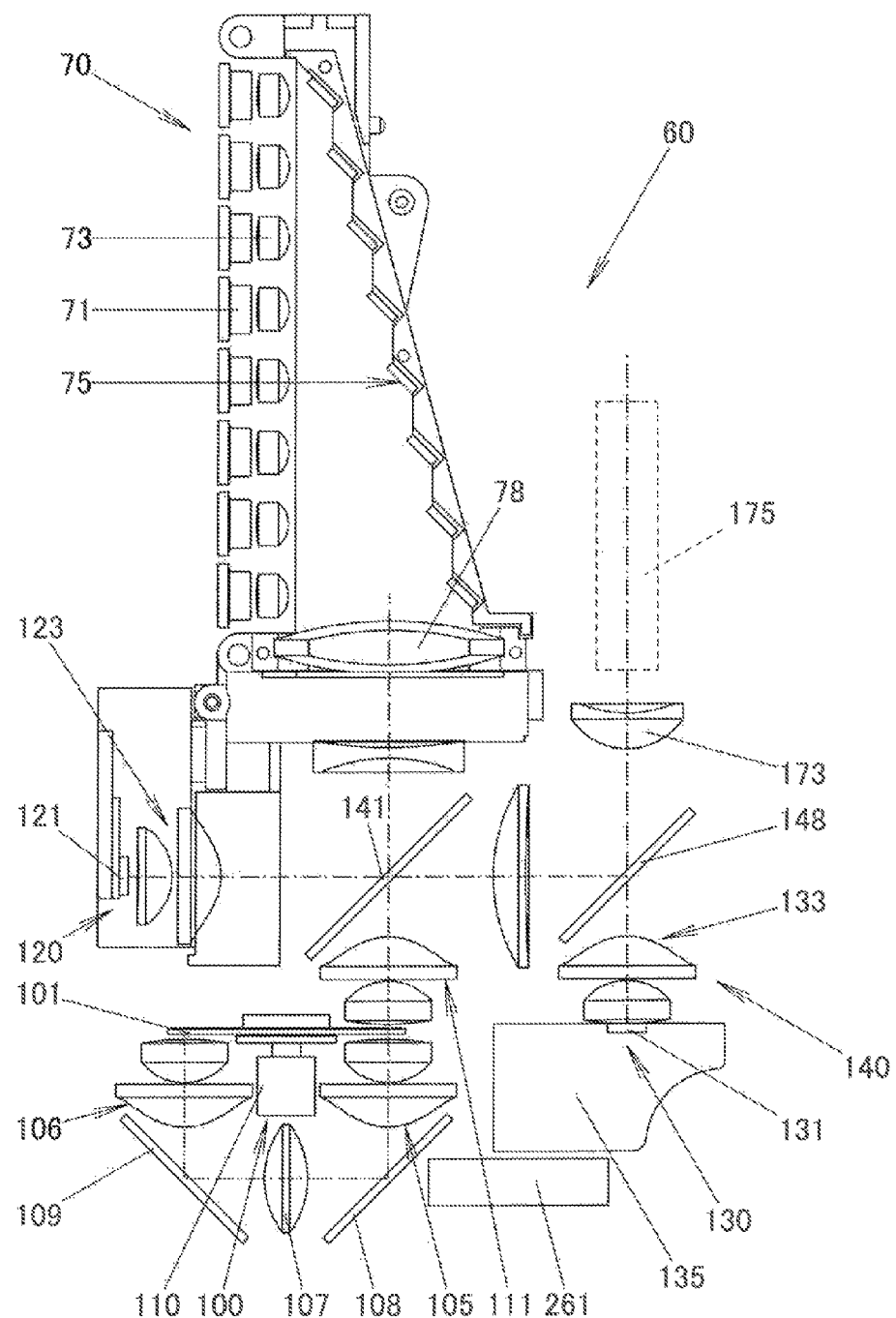
FIG. 4 shows one example of the construction of a light source unit according to the embodiment of the invention.

As shown in FIGS. 3 and 4, the light source unit 60 is disposed substantially in a central portion with respect to a left-to-right direction of the projector casing and has the excitation light shining device 70 and the luminous light emitting device 100 as a green light source device. The excitation light shining device 70 is disposed near the back panel 13, and the luminous light emitting device 100 is disposed near the front panel 12. Further, the light source unit 60 includes the blue light source device 130 which is disposed near the front panel 12 and which emits light in parallel to a pencil of light emitted from the luminous light emitting device 100 and the red light source device 120 which is disposed between the excitation light shining device 70 and the luminous light emitting device 100 and which emits light so that the light emitted intersects the pencil of light emitted from the luminous light emitting device 100.

The light source unit 60 includes the light guiding optical system 140 which changes directions of light emitted from the luminous light emitting device 100, light emitted from the red light source device 120 and light emitted from the blue light source device 130 so that the green, red and blue lights are directed in the same direction so as to be collected to the entrance of the light tunnel 175.

The excitation light shining device 70 of the green light source device includes the excitation light sources 71 which are disposed so that optical axes thereof become parallel to the back panel 13, a group of reflecting mirrors 75 which changes the axis of light emitted from the excitation light sources 71 by 90 degrees in the direction of the front panel 12, a collective lens 78 which collects the light emitted from the excitation light sources 71 and reflected by the group of reflecting mirrors 75, and a heat sink 81 which is disposed between the excitation light sources 71 and the right panel 14.

The excitation light sources 71 are blue laser diodes which are arranged into a matrix. Collimator lenses 73 which convert light emitted from the blue laser diodes into parallel light are disposed individually on optical axes of the blue laser diodes. In addition, in the group of reflecting mirrors 75, a plurality of reflecting mirrors 75 are arranged into a stair shape so as to direct pencils of light emitted from the excitation light sources 71 towards the collective lens 78 while narrowing sectional areas thereof in one direction.

A cooling fan 261 is disposed between the heat sink 81 and the back panel 13, so that the excitation light sources 71 are cooled by the cooling fan 261 and the heat sink 81. Further, a cooling fan 261 is also disposed between the group of reflecting mirrors 75 and the back panel 13, so that the group of reflecting mirrors 75 and the collective lens 78 are cooled by the cooling fan 261.

The luminous light emitting device 100 includes the luminescent wheel 101, a rotational motor 110, and the light guiding optical system. The luminescent wheel 101 functions as a rotational member which is disposed so as to be parallel to the front panel 12, that is, as a rotational member which has a rotational axis which is parallel to an axis of excitation light and which is disposed so as to intersect an axis of light emitted from the excitation light shining device 70 at right angles. The rotational motor 110 is a wheel motor which functions as a driving device for driving rotationally the luminescent wheel 101. The light guiding optical system functions to shine light which passes through the luminescent wheel 101 to emanate from the luminescent wheel 101 on to the other portion of the luminescent wheel 101 and has the first mirror 108 and the second mirror 109, the first collective lens 105, the second collective lens 106 and the intermediate collective lens 107.

In addition, although it will be described in detail later, the luminescent wheel 101 has the diffuse transmission portion 104, the first luminescent material layer 102 which is placed beside the diffuse transmission portion 104 on the side of the luminescent wheel 101 which faces the front panel 12, and the second luminescent material layer 103 which is placed on the side of the luminescent wheel 101 which faces the back panel 13.

The first mirror 108 of the light guiding optical system is disposed on the axis of light emitted from the excitation light shining device 70 and disposed at a position closer to the front panel 12 than that of the luminescent wheel 101. This mirror 108 reflects excitation light which passes through the diffuse transmission portion 104 of the luminescent wheel 101 so as to convert the light into light having an axis which is substantially parallel to the front panel 12. The first collective lens 105 collects excitation light which passes through the luminescent wheel 101 to shine the collected excitation light on to the first mirror 108. The intermediate collective lens 107 collects excitation light reflected by the first mirror 108 to shine the collected excitation light on to the second mirror 109. Then, the excitation light is reflected by the second mirror 109, and the second collective lens 106 collects the reflected excitation light to shine the collected excitation light on to the luminescent material layer 102 on the luminescent wheel.

In addition, luminous light emitted from the first luminescent material layer 102 is guided by the light guiding optical system in such a way that luminous light emitted from one side of the luminescent wheel 101 is caused to enter the other portion of the luminescent wheel 101. Specifically, luminous light emanating from the first material layer 102 is collected by the second collective lens 106 and is then reflected by the second mirror 109. Then, the luminous light so reflected is collected by the intermediate collective lens 107 and is reflected by the first mirror 108 to be incident on the diffuse transmission portion 104 of the luminescent wheel 101 through the first collective lens 105. It is noted that there may be a situation in which the intermediate collective lens 107 is omitted from the light guiding optical system, depending on the combination of the lenses.

The luminous light emitting device 100 includes further a group of collective lenses 111. Luminous light emitted from the luminescent material layer 102 of the luminescent wheel 101 is guided to the diffuse transmission portion 104 by the light guiding optical system in the way described above and then passes through the diffuse transmission portion 104 to thereby diffuse the luminous light. The luminous light emanates from the luminescent wheel 101 in the direction of the back panel 13 as a pencil of light, and this pencil of light is collected by the group of collective lenses 111.

Figure 5A:
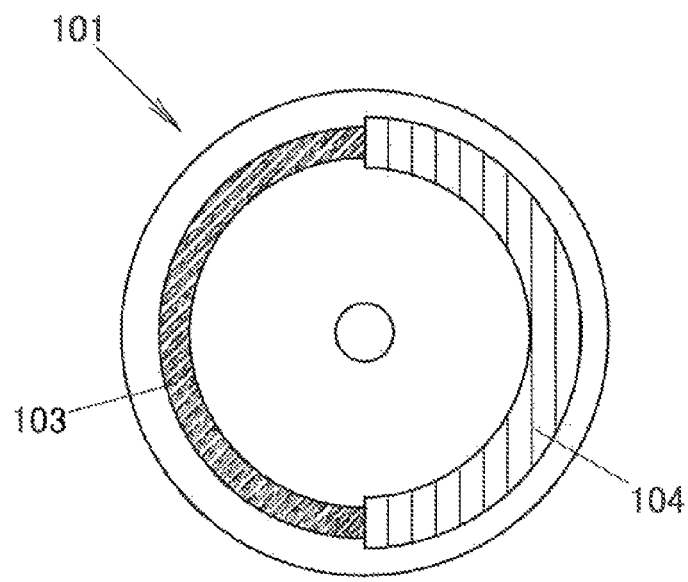
FIGS. 5A, 5B and 5C show front, side and rear views of one example of a luminescent wheel according to the embodiment of the invention.
Figure 5B:
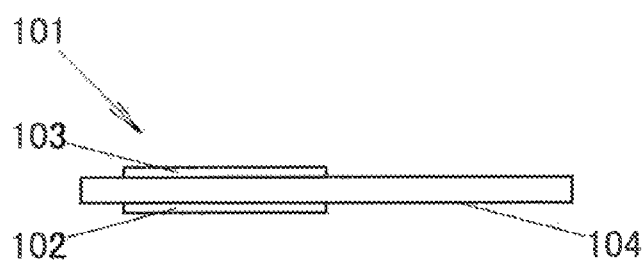
Figure 5C:
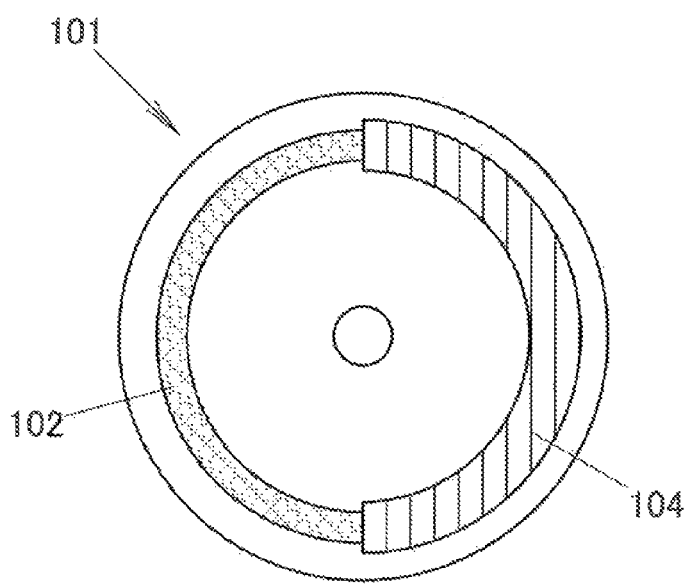

As shown in FIG. 5, this luminescent wheel 101 is formed of a circular disk-shaped metallic base and has the second luminescent material layer 103 on one side and the first luminescent material layer 102 on the other side thereof. The first luminescent material layer 102 has a semi-annular arc-like shape. The size and shape of the first luminescent material layer 102 are the same as those of the second luminescent material layer 103. Further, As shown in FIG. 5, the diffuse transmission portion 104 has a semi-annular arc-like shape and is formed so as to extend along a semicircular portion of the luminescent wheel 101 in such a way as to be placed in a circumferential direction beside the first luminescent material layer 102 and the second luminescent material layer 103 in an end to end fashion.

The diffusion transmission portion 104 which transmits light in a diffusing fashion is formed as a semi-annular diffuse transmission area which is placed beside the first luminescent material layer 102, which is formed as a luminous light emitting area, in an end to end fashion. A base used for this diffuse transmission portion 104 formed as the diffuse transmission area is a transparent base which can transmit light. Minute irregularities are formed at random on some portion of a surface of the base through sandblasting so that some portion of the surface of the base is formed into a diffuse plate. This diffuse plate transmits light in a diffusing fashion and is given a semicircular shape so as to be fixedly incorporated in the luminescent wheel 101, whereby the diffuse transmission area is formed.

In addition, in the luminous light emitting area made up of the luminescent material layer, a semi-annular luminous light emitting area is formed in the circular disk-shaped metallic base as a recess portion, and this semi-annular luminous light emitting area emits luminous light of a range of green wavelengths by using light emitted from the excitation light sources 71 as excitation light. Then, a green luminescent material is applied to this recess portion so as to form the first luminescent material layer 102.

It is noted that the first luminescent material layer 102 is formed on the side of the sides of the luminescent wheel 101 which faces the front panel 12 of the projector 10 when the luminescent wheel 101 is set in the projector 10.

Additionally, a similar recess portion is also formed in the side of the luminescent wheel 101 which lies opposite to the side where the first luminescent material layer 102 is formed, facing the excitation light shining device 70, and the second luminescent material layer 103 is formed in this recess portion.

The second luminescent material layer 103 is made up of a luminescent material layer which emits luminous light of a range of green wavelengths identical to that of the luminescent material of the first luminescent material layer 102, a luminescent material layer which emits luminous light of a range of green wavelengths which is close to that of the luminous light emitted by the first luminescent material layer 102 or a luminescent material layer of a luminescent material which emits light of a range of wavelengths of a complementary color such as light of a range of yellow wavelengths.

The sides of the luminescent wheel 101 on which the luminous light emitting areas are to be formed are mirror finished through silver deposition to form a reflecting surface which reflects light, and the first luminescent material layer 102 and the second luminescent material layer 103 are laid on the reflecting surfaces.

In this luminescent wheel 101, light emitted from the excitation light shining device 70 to be shone on to the first luminescent material layer 102 excites the green luminescent material of the first green luminescent material layer 102 through the diffuse transmission portion 104 and the light guiding optical system. Then, pencils of luminous light are emitted in every direction from the green luminescent material to be directed towards the front panel 12 or to be reflected on the reflecting surface of the luminescent wheel 101 to thereby be redirected towards the front panel 12 thereafter. In addition, excitation light which is shone on to the metallic base without being absorbed by the luminescent material of the first luminescent material layer 102 is reflected by the reflecting surface so as to be redirected to be incident on the first luminescent material layer 102 to thereby excite the first luminescent material layer 102. Thus, by forming the surfaces of the recess portions of the luminescent wheel 101 into the reflecting surfaces, the utilization efficiency of excitation light emitted from the excitation light sources 71 can be enhanced, whereby brighter luminous light can be emitted from the luminescent wheel 101.

Also, in the second luminescent material layer 103 formed on the side of the luminescent wheel 101 which faces the excitation light shining device 70, light emitted from the excitation light shining device 70 is caused to be incident on the second luminescent material layer 103 via the group of collective lenses 11 to thereby excite the luminescent material of the second luminescent material layer 103 in a similar fashion to that in which the luminescent material of the first luminescent material layer 102 is excited. On the other hand, excitation light shone on to the metallic base or luminous light directed from the second luminescent material to the metallic base without being absorbed by the luminescent material is reflected on the reflecting surface so as to be emitted from the second luminescent material towards the excitation light shining device 70 effectively.

Further, light emitted from the first luminescent material layer 102 is collected by the second collective lens 106 and is reflected by the second mirror 109 of the light guiding optical system. Then, the light passes through the intermediate collective lens 107 and thereafter is reflected by the first mirror 108 to thereby be shone on to the diffuse transmission portion 104 of the luminescent wheel 101. In being shone on to the diffuse transmission portion 104, the light is collected by the first collective lens 105 and passes through the diffuse transmission portion 104, and the light which passes through the diffuse transmission portion 104 is diffused, the resulting diffuse light being collected by the group of collective lenses 111.

In this way, light emitted from the first luminescent material layer 102 is collected and diffused, whereafter the light is collected further for emission from the luminous light emitting device 100. Therefore, a pencil of light emitted from the luminous light emitting device 100 as the green light source becomes light in which the in-pane uniformity of luminous light is enhanced.

Consequently, in the green light source made up of the excitation light shining device 70 and the luminous light emitting device 100, when excitation light is incident on the diffuse transmission portion 104 by illuminating the excitation light sources 71 of the excitation light shining device 70 to emit luminous light of the range of green wavelengths from the first luminescent material layer 102, light of the range of green wavelengths which has passed through the diffuse transmission portion 104 and which has the high in-plane uniformity of light can be emitted so as to form a projection image having a good picture quality. In addition, when excitation light is shone on to the second luminescent material layer 103 by delaying the illumination timing of the excitation light sources 71 so as to match it to the rotational timing of the luminescent wheel 101 so that luminous light from the second luminescent material layer 103 is emitted from the luminous light emitting device 100, luminous light can be emitted without passing through the diffuse transmission portion 104. Thus, in the event that the same luminescent material as that of the first luminescent material layer 102 is used for the second luminescent material layer 103, it is possible to project an image having higher luminance.

In addition, when a luminescent material which emits luminous light of a range of wavelengths close to that of luminous light emitted from the first luminescent material layer 102 is used for the second luminescent material layer 103, the picture quality of a projection image can be changed by switching the modes of the projector. When a luminescent material which emits luminous light of a range of wavelengths of a complementary color is used for the second luminescent material layer 103, excitation light is shone on to the first luminescent material layer 102 and the second luminescent material layer 103 by controlling the illumination timing of the excitation light sources 71, thereby making it possible to emit light in which the complementary color wavelength range is added to the green wavelength range from the luminous light emitting device 100.

In addition, when the luminescent material which is the same or similar to the luminescent material of the first luminescent material layer 102 is used for the second luminescent material layer 103, in case the luminescent material of the first luminescent material layer 102 is deteriorated or damaged, light of the range of green wavelengths can still be emitted by using the second luminescent material layer 103.

The red light source device 120 includes the red light source 121 which is disposed so that an optical axis thereof becomes parallel to those of the excitation light sources 71 and a group of collective lenses 123 which collects light emitted from the red light source 121. The red light source device 120 is disposed so that an optical axis thereof intersects the axis of light emitted from the excitation light shining device 70 and the axis of light of the range of green wavelength emitted from the luminescent wheel 101. In addition, the red light source 121 is the red light emitting diode as a semiconductor light emitting element which emits light of a range of red wavelengths. Further, the red light source device 120 includes a heat sink 125 which is disposed on a side of the red light source 121 which faces the red panel 14. A cooling fan 261 is disposed between the heat sink 125 and the front panel 12, whereby the red light source 121 is cooled by this cooling fan 261.

The blue light source device 130 includes the blue light source 131 which is disposed so that an optical axis thereof becomes parallel to the axis of light emitted from the luminous light emitting device 100 and a group of collective lenses 133 which collects light emitted from the blue light source 131. In addition, the blue light source device 130 is disposed so that an optical axis thereof intersects the axis of light emitted from the red light source device 120. The blue light source 131 is the blue light emitting diode as a semiconductor light emitting element which emits light of a range of blue wavelengths. Further, the blue light source device 130 includes a heat sink 135 which is disposed on a side of the blue light source 131 which faces the front panel 12. A cooling fan 261 is disposed between the heat sink 135 and the front panel 12, whereby the blue light source 131 is cooled by this cooling fan 261.

The light guiding optical system 140 includes the collective lenses which collect pencils of light of red, green and blue wavelength ranges and the dichroic mirrors which change the axes of pencils of red, green and blue light so that the axes are directed in the same direction and so on. Specifically, a first dichroic mirror 141 is disposed in a position where the axis of light of the range of blue wavelengths emitted from the excitation light shining device 70, the axis of light of the range of green wavelengths emitted from the luminescent wheel 101 and the axis of light of the range of red wavelengths emitted from the red light source 120 intersect one another. This first dichroic mirror 141 transmits light of the range of blue wavelengths and light of the range of red wavelengths and reflects light of the range of green wavelengths in such a way that the axis of green light is changed by 90 degrees in the direction of the left panel 15.

A second dichroic mirror 148 is disposed in a position where the axis of light of the range of blue wavelengths emitted from the blue light source device 130 and the axis of light of the range of red wavelengths emitted from the red light source device 120 intersect each other. This second dichroic mirror 148 transmits light of the range of blue wavelengths and reflects light of the range of green wavelengths and light of the range of red wavelengths in such a way that the axes of green light and red light are changed by 90 degrees in the direction of the back panel 13. A collective lens is disposed between the first dichroic mirror 141 and the second dichroic mirror 148.

The light-source-side optical system 170 has the light tunnel 175 which converts a pencil of light emitted from the light source unit 60 into a pencil of light whose intensity is uniformly distributed, a collective lens 173 which collects light source light to an incident plane of the light tunnel 175, a collective lens 178 which collects light emanating from the light tunnel 175, a light axis changing mirror 181 which changes the axis of a pencil of light emanating from the light tunnel 175 in the direction of the left panel 15, a collective lens 183 which collects the light source light reflected by the light axis changing mirror 181 to the display element 51, and a light shining mirror 185 which shines the pencil of light which passes through the collective lens 183 on to the display element 51 at a predetermined angle.

Consequently, the light source light is shone on to the DMD which is the display element 51 by the light shining mirror 185 of the light-source-side optical system 170. Then, the display element 51 is controlled to be driven by the display driving module 26 so as to allow "on" light to be incident on the projection-side optical system 220.

Additionally, a collective lens 195 which makes up apart of the projection-side optical system 220 is disposed near the front of the display element. A heat sink 190 is disposed between the display element 51 and the back panel 13 so as to cool the display element 51, whereby the display element 51 is cooled by this heat sink 190.

The projector 10 has a group of lenses of the projection-side optical system 220 which projects "on" light reflected by the display element 51 on to a screen along the left panel 15. A variable-focus lens system is provided as the projection-side optical system 220, and the variable-focus lens system include a group of fixed lenses 225 which is incorporated in a fixed lens barrel and a group of movable lenses 235 which is incorporated in a movable lens barrel, thus a zooming function being given to the variable-focus lens system. The group of movable lenses 235 is moved by a lens motor for zooming and focusing.

Consequently, the turning on and off of the excitation light shining device 70, the red light source device 120 and the blue light source device 130 are individually controlled in a time-sharing fashion by the light source control unit so that combined light or light of a single color can be emitted from the light source unit 60. In addition, the DMD which is the display element 51 of the projector 10 displays red, green and blue light in a time-sharing fashion according to data, thereby making it possible to produce a highly bright color image on the screen.

In the light source unit according to this embodiment, excitation light is shone on to the first luminescent material layer 102 and the second luminescent material layer 103 according to the illumination timing of the excitation light sources 71 so that light of the range of green wavelengths from the first luminescent material layer 102 is emitted from the luminous light emitting device 100 of the green light source device via the semi-annular diffuse transmission portion 104. Therefore, the luminous light from the first luminescent material layer 102 can be emitted as a pencil of luminous light having high in-plane uniformity of light. Additionally, luminous light from the second luminescent material layer 103 can also be emitted from the luminous light emitting device 100. Thus, the utilization of the luminescent wheel 101 which is the rotational member can be enhanced, extending the life of the light source unit and hence the projector 10, or the picture quality and brightness of a projection image can easily be changed.

In the event that excitation light and luminous light emitted from the first luminescent material layer 102 are made to pass through the diffuse transmission portion 104, with the second luminescent material layer 103 provided on the excitation light source side and the first luminescent material layer 102 provided on the front panel 12 side of the luminescent wheel 101, a high-quality image can be projected by the light of the range of green wavelengths which has high in-plane uniformity. In addition to this, the added value of the light source unit and the projector incorporating the light source unit can easily be enhanced.

In addition, in the event that the rotational axis of the luminescent wheel is made parallel to the axis of excitation light, the axis of luminous light emitted from the first luminescent material layer 102 and the axis of luminous light emitted from the second luminescent material layer 103 can easily be made to coincide with each other when they are emitted from the luminous light emitting device 100.

Additionally, in the event that the light guiding optical system is formed of the mirrors and collective lenses, luminous light emitted from the first luminescent material layer 102 of the luminescent wheel 101 is easily allowed to be incident on the diffuse transmission portion 104 of the luminescent wheel 101 effectively.

Further, in the event that the excitation light sources are formed of a laser emitting device, the light source can easily emit highly bright light.

It is noted that the light guiding optical system does not have to use the mirrors and can use a reflection prism in place of the mirrors and the intermediate collective lens.

In addition, even though the first luminescent material layer 102 and the second luminescent material layer 103 are formed of the same luminescent material, light emitted from the first luminescent material layer 102 passes through the diffuse transmission portion 104 and light emitted from the second luminescent material layer 103 does not pass through the diffuse transmission portion 104. Therefore, when images are formed by the light from the first luminescent material layer 102 and the light from the second luminescent material layer 103, the resulting two images differ from each other in brightness and picture quality.

In the embodiment described above, images are formed by making use of the difference in brightness and picture quality between them. However, being different from the embodiment, a configuration may be adopted in which image signals are corrected so that even though light from the first luminescent material layer 102 and light from the second luminescent material layer 103 are used to form images, the resulting two images do not differ from each other in brightness and picture quality. The correction applied to the image signals should be implemented, for example, by using a correction parameter which is determined in advance through comparison of the image formed by the use of light from the first luminescent material layer 102 with the image formed by the use of light from the second luminescent material layer 103.

By dong so, even though the second luminescent material layer 103 is used when the luminescent material of the first luminescent material layer 102 is deteriorated or damaged, the user can be kept unaware of whether an image he or she is watching is formed either by the light from the first luminescent material layer 102 or by the light from the second luminescent material layer 103. Thus, natural projection images can be provided at all times during the use of the projector 10.

Figure 6:
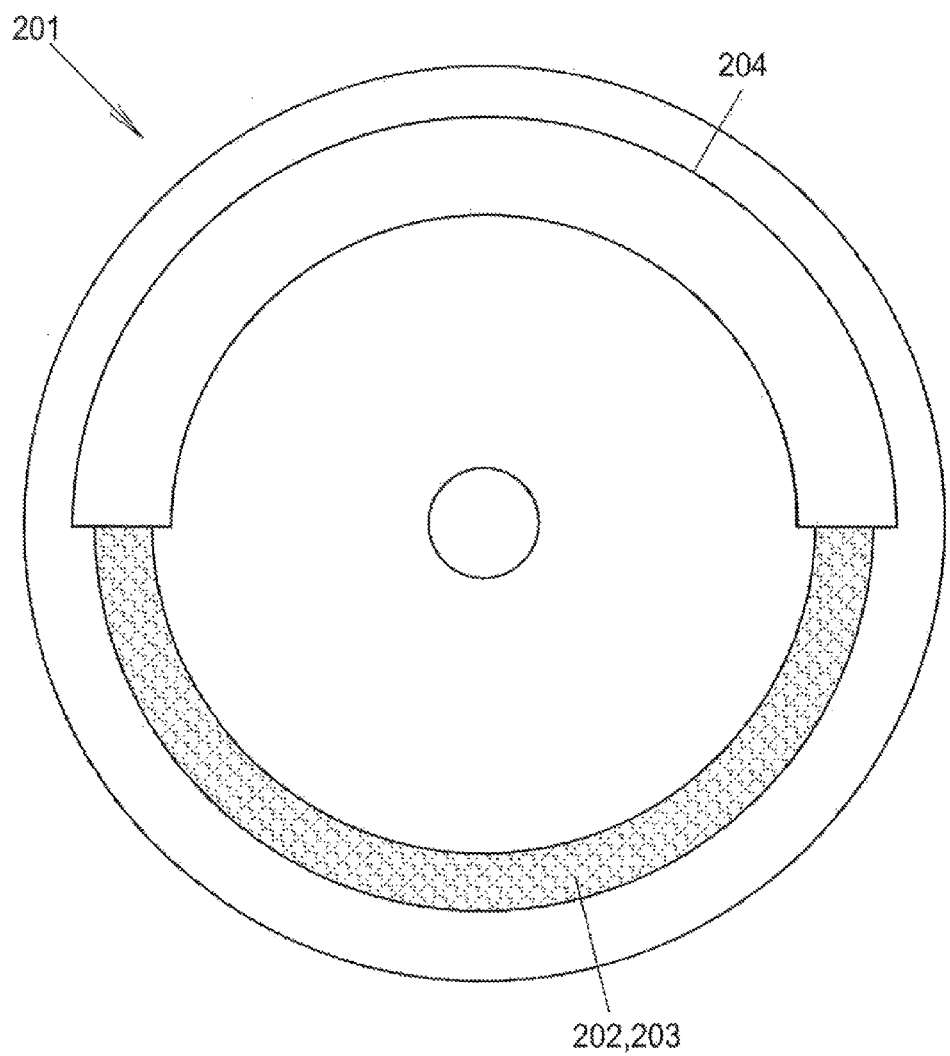
FIG. 6 is a front view of one example of a luminescent wheel according to another embodiment of the invention.

FIG. 6 shows the configuration of a luminescent wheel 201 according to another embodiment of the invention. This luminescent wheel 201 has green luminescent material layers 202 and 203 individually on both sides thereof, the green luminescent material layers 202, 203 each having a semi-annular shape and being laid to extend circumferentially over half a circumference of the luminescent wheel 201. Similar to the luminescent material layers 102 and 103 shown in FIGS. 5A to 5C, the green luminescent material layers 202 and 203 are laid out individually on one side and the other side of the luminescent wheel 201. This luminescent wheel 201 has further a transmission area 204 which is laid out so as to extend circumferentially over half a circumference thereof on an opposite side to the areas where the luminescent material layers 202 and 203 are laid out. This transmission area 204 differs from the diffuse transmission portion 104 shown in FIG. 5 in which light transmitted therethrough is not diffused. Light of the range of blue wavelengths emitted from the excitation light shining device 70 and luminous light emitted from the luminescent material layer are transmitted through the transmission area 204 as they are or without being diffused.

Namely, light of the range of blue wavelengths emitted form the excitation light shining device 70 is transmitted through the transmission area 204 and is incident on the green luminescent material layer 202 which is laid out on the one side of the luminescent wheel 201 via an optical system including reflecting mirrors 108, 109 and a collective lens 107. By adopting this configuration, the green luminescent material layers 202 and 203 can be used in synchronism with an excitation light shining timing of the excitation light shining device 70 and the rotation of the luminescent wheel 201 on both the sides of the luminescent wheel 201, whereby the deterioration of the luminescent materials can be suppressed, enabling the light source unit to be used for a long period of time.

In addition, the invention is not limited to the embodiments that have been described heretofore, and hence, the invention can be modified variously in stages where the invention is carried out without departing from the spirit and scope of the invention. Additionally, in carrying out the invention, the functions executed in the embodiments may be combined as required as much as possible. The embodiments include various stages, and various inventions can be extracted by appropriate combinations of the constituent elements disclosed. For example, as long as an advantage can be obtained even though some of all the constituent elements disclosed in the embodiments are deleted, the configuration in which some such constituent elements are deleted can be extracted as an invention.

What is claimed is:

1. A light source unit comprising:
   an excitation light source which emits excitation light; and
   a luminescent member which comprises a transmission portion transmitting excitation light from the excitation light source, a first luminescent material layer being placed beside the transmission portion on one side of the luminescent member, and a second luminescent material layer being placed beside the transmission portion on the other side of the luminescent member, wherein at least one of the first luminescent material layer and the second luminescent material layer emits luminous light by being excited by the excitation light; and
   a guiding optical system which guides the excitation light and the luminous light so as to shine the excitation light which has passed through the transmission portion from the excitation light source onto the first luminescent material layer and to cause luminous light emitted from the first luminescent material layer to be incident on the transmission portion,
   wherein the second luminescent material layer is disposed so as to face the excitation light source, and the transmission portion transmits the excitation light and the luminous light from the first luminescent material layer.

2. The light source unit according to claim 1, wherein the luminescent member comprises a circular disk-like shape and rotates,
   wherein the transmission portion, the first luminescent material layer and the second luminescent material layer are formed into an arc-like shape, and
   wherein the transmission portion is formed in a half area of the circular disk-like shape of the luminescent member.

3. The light source unit according to claim 1, wherein the first luminescent material layer and the second luminescent material layer comprise luminescent materials which emit luminous light of different luminous wavelengths when the excitation light is incident on the first and second luminescent material layers.

4. The light source unit according to claim 1, wherein the first luminescent material layer and the second luminescent material layer comprise luminescent materials which emit luminous light of a same luminous wavelength when the excitation light is incident on the first and second luminescent material layers.

5. The light source unit according to claim 1, wherein a diffuse plate is disposed on the transmission portion of the luminescent member.

6. The light source unit according to claim 1, wherein the guiding optical system has a mirror and a collective lens.

7. The light source unit according to claim 1, wherein the excitation light source is a laser emitting device.

8. A projector comprising:

the light source unit according to claim 1;

an image input unit into which an image signal is inputted;

a light-source-side optical system which guides light from the light source unit to a display element;

a display element which forms an optical image by light shone thereon;

a projection-side optical system which projects an optical image formed by the display element using the image signal onto a screen; and a projector control unit which has a light source control module for the light source unit and a display element control module.

9. The projector according to claim 8, wherein the projector control unit controls a rotation of the luminescent member and the excitation light source so that the excitation light from the excitation light source is incident on at least one of the first luminescent material layer and the second luminescent material layer.

10. The projector according to claim 8, wherein the projector control unit corrects the image signal so that both an image formed using light emitted from the first luminescent material layer and an image formed using light emitted from the second luminescent material layer are equal in at least one of picture quality and brightness.

11. A light source illumination method of a light source unit, the light source unit comprising an excitation light source which emits excitation light, and a luminescent rotational member which is a rotational member onto which the excitation light is shone and which has a transmission portion, a first luminescent material layer being placed beside the transmission portion in a predetermined area on one side of the rotational member, and a second luminescent material layer being placed beside the transmission portion in a predetermined area on the other side of the rotational member, wherein at least one of the first luminescent material layer and the second luminescent material layer emits luminous light by being excited by the excitation light, and wherein a guiding optical system is configured so as to shine excitation light which has passed through the transmission portion from the excitation light source onto the first luminescent material layer and to cause luminous light emitted from the first luminescent material layer to be incident on the transmission portion, the light source illumination method comprising:

turning on and off the excitation light source while rotating the rotational member by a rotational motor;

emitting the luminous light from the first luminescent material layer by shining the excitation light onto the transmission portion by matching an illumination timing of the excitation light source to the rotation of the rotational member and shining the excitation light onto the first luminescent material layer via the transmission portion and the guiding optical system; and emitting luminous light from the second luminescent material layer by shining the excitation light onto the second luminescent material layer by changing the illumination timing of the excitation light source.

\* \* \* \* \*